(12) United States Patent
Tsirkin

(10) Patent No.: US 11,194,702 B2
(45) Date of Patent: Dec. 7, 2021

(54) HISTORY BASED BUILD CACHE FOR PROGRAM BUILDS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 3 days.

(21) Appl. No.: 16/773,457

(22) Filed: Jan. 27, 2020

(65) Prior Publication Data
US 2021/0232492 A1    Jul. 29, 2021

(51) Int. Cl.
*G06F 11/36* (2006.01)
*G06F 21/56* (2013.01)
(Continued)

(52) U.S. Cl.
CPC .......... *G06F 11/3688* (2013.01); *G06F 8/71* (2013.01); *G06F 11/3664* (2013.01);
(Continued)

(58) Field of Classification Search
CPC .......... G06F 11/3688; G06F 11/3696; G06F 11/3466; G06F 11/3692; G06F 11/3664; G06F 11/36; G06F 11/3404; G06F 11/1458; G06F 8/71; G06F 8/37; G06F 8/36; G06F 8/10; G06F 8/65; G06F 8/658; G06F 8/75; G06F 8/20; G06F 16/2246; G06F 16/183; G06F 16/10; G06F 16/957; G06F 16/188;
(Continued)

(56) References Cited

U.S. PATENT DOCUMENTS 5,649,200 A * 7/1997 Leblang .............. G06F 8/71
707/999.202
5,806,078 A * 9/1998 Hug .................. G06F 40/197
715/205

(Continued)

OTHER PUBLICATIONS

Gregg Rothermel et al., A Safe, Efficient Regression Test Selection Technique, 1997, [Retrieved on Jul. 13, 2021], Retrieved from the internet: <URL: https://dl.acm.org/doi/pdf/10.1145/248233.248262> 38 Pages (173-210) (Year: 1997).*

(Continued)

*Primary Examiner* — Anibal Rivera
(74) *Attorney, Agent, or Firm* — K&L Gates LLP (57) ABSTRACT

A system includes a memory storing program versions in a program history and a processor in communication with the memory. The processor is configured to store program components of a version of a program in a first directory associated with the version and select first and second candidate versions of the program from the program history to compare to a test version of the program. The processor is also configured to compare the first and second candidate versions to the test version, estimate an amount of work to regenerate the program from each of the candidate versions, and select the candidate version associated with a lesser amount of work. Additionally, the processor is configured to regenerate the program using components from the selected candidate version to create a regenerated program, store components of the regenerated program in a second directory associated with test version, and test the regenerated program.

20 Claims, 7 Drawing Sheets

(51) Int. Cl.
*G06F 9/44* (2018.01)
*G06F 8/71* (2018.01)
*G06F 21/55* (2013.01)
*G06F 11/34* (2006.01)
*G06F 21/12* (2013.01)

(52) U.S. Cl.
CPC ...... *G06F 11/3692* (2013.01); *G06F 11/3696* (2013.01); *G06F 11/3404* (2013.01); *G06F 11/3466* (2013.01); *G06F 21/121* (2013.01); *G06F 21/554* (2013.01)

(58) Field of Classification Search
CPC .. G06F 21/121; G06F 21/554; G06F 9/45516; G06F 9/448; G06F 9/541
See application file for complete search history.

(56) References Cited

U.S. PATENT DOCUMENTS

| | | | | |
|---|---|---|---|---|
| 6,298,353 | B1* | 10/2001 | Apte | G06F 8/71 |
| 6,366,933 | B1* | 4/2002 | Ball | G06F 16/957 |
| | | | | 715/203 |
| 6,654,954 | B1* | 11/2003 | Hicks | G06F 9/45516 |
| | | | | 707/999.202 |
| 7,076,778 | B2* | 7/2006 | Brodersen | G06F 8/65 |
| | | | | 717/170 |
| 7,124,101 | B1* | 10/2006 | Mikurak | G06Q 10/06 |
| | | | | 705/35 |
| 7,568,183 | B1* | 7/2009 | Hardy | G06F 11/3684 |
| | | | | 717/121 |
| 7,716,077 | B1* | 5/2010 | Mikurak | G06Q 10/06 |
| | | | | 705/7.12 |
| 8,121,874 | B1* | 2/2012 | Guheen | G06Q 10/087 |
| | | | | 705/7.11 |
| 8,165,998 | B2* | 4/2012 | Semerdzhiev | G06F 16/10 |
| | | | | 707/690 |
| 8,438,558 | B1* | 5/2013 | Adams | G06F 8/658 |
| | | | | 717/170 |
| 9,268,663 | B1* | 2/2016 | Siddiqui | G06F 11/3404 |
| 9,326,001 | B2* | 4/2016 | Head | H04N 19/507 |
| 9,430,274 | B2* | 8/2016 | Zhang | G06F 16/2308 |
| 10,678,678 | B1* | 6/2020 | Tsoukalas | G06F 11/3664 |
| 10,922,216 | B1* | 2/2021 | Kumar | G06F 11/3684 |
| 2009/0083268 | A1* | 3/2009 | Coqueret | G06F 8/71 |
| 2011/0029634 | A1* | 2/2011 | Gimson | G06F 40/197 |
| | | | | 709/217 |
| 2011/0093701 | A1* | 4/2011 | Etchegoyen | G06F 21/121 |
| | | | | 713/165 |
| 2011/0137634 | A1* | 6/2011 | Avadhanula | G06F 8/36 |
| | | | | 703/13 |
| 2011/0246869 | A1* | 10/2011 | Vion-Dury | G06F 40/143 |
| | | | | 715/229 |
| 2012/0005537 | A1* | 1/2012 | Chen | G06F 11/3692 |
| | | | | 714/38.1 |
| 2012/0243795 | A1* | 9/2012 | Head | G06T 11/60 |
| | | | | 382/218 |
| 2013/0024435 | A1* | 1/2013 | Poirier | G06F 16/27 |
| | | | | 707/695 |
| 2015/0186407 | A1* | 7/2015 | Xu | G06F 16/1873 |
| | | | | 707/638 |
| 2015/0254073 | A1* | 9/2015 | Menard | G06F 3/04842 |
| | | | | 717/122 |
| 2015/0363294 | A1* | 12/2015 | Carback, III | G06F 8/37 |
| | | | | 717/132 |
| 2016/0078386 | A1* | 3/2016 | Herzog | G06Q 10/06316 |
| | | | | 705/7.26 |
| 2016/0232354 | A1* | 8/2016 | Fraser | G06F 21/554 |
| 2016/0306560 | A1* | 10/2016 | Maranna | G06F 3/067 |
| 2017/0329693 | A1* | 11/2017 | Li | G06F 8/75 |
| 2018/0024746 | A1* | 1/2018 | Jagadeesh | G06F 3/0641 |
| | | | | 711/154 |
| 2018/0025026 | A1* | 1/2018 | Shaw, Jr. | G06F 16/183 |
| | | | | 707/626 |
| 2018/0129483 | A1* | 5/2018 | Biddle | G06Q 10/06 |
| 2018/0129494 | A1* | 5/2018 | Odvody | G06F 9/541 |
| 2018/0253296 | A1* | 9/2018 | Brebner | G06F 8/20 |
| 2019/0050296 | A1* | 2/2019 | Luo | G06F 11/1458 |
| 2019/0108099 | A1* | 4/2019 | Mazumdar | G06F 16/188 |
| 2019/0147402 | A1* | 5/2019 | Sitrick | H04M 3/567 |
| | | | | 705/301 |
| 2019/0227912 | A1* | 7/2019 | Banuelos | G06F 11/3664 |
| 2020/0099926 | A1* | 3/2020 | Tanner | H04N 19/105 |
| 2020/0125485 | A1* | 4/2020 | Wiener | G06F 11/3466 |

OTHER PUBLICATIONS

Christian Macho et al., Extracting Build Changes with BuildDiff, 2017 IEEE, [Retrieved on Jul. 13, 2021], Retrieved from the internet: <URL: https://ieeexplore.ieee.org/stamp/stamp.jsp?tp=&arnumber=7962386> 11 Pages (368-378) (Year: 2017).*

Jeff Arnold and M. Frans Kaashoek; "Ksplice: Automatic Rebootless Kernel Updates"; Massachusetts Institute of Technology; Accessed Date: Dec. 19, 2019; https://www.ksplice.com/doc/ksplice.pdf; 12 Pages.

Hamed Esfahani, Jonas Fietz, Qi Ke, Alexei Kolomiets, Erica Lan, Erik Mavrinac, Wolfram Schulte, Newton Sanches, Srikanth Kandula; Microsoft; "CloudBuild: Microsoft's Distributed and Caching Build Service"; © 2016 Copyright Publication rights licensed to ACM; ISBN 978-1-4503-4205—Jun. 16, 2005; ICSE '16 Companion, May 14-22, 2016; Austin, TX, USA; 10 Pages.

* cited by examiner

FIG. 6

HISTORY BASED BUILD CACHE FOR PROGRAM BUILDS

BACKGROUND

Computer systems may run applications or services that are provided via a server or cloud. The applications or services (e.g., software or programs) can be developed and deployed as a single unit or as multiple units that run within containers, which may be run on physical or virtual machines. For example, containers may encapsulate a lightweight runtime environment for an application or a microservice. Application updates and new application features are often implemented in new containers. For example, software developers may frequently provide updates and additional application features to remain competitive in the microservices field. Additionally, developers may develop software through various development cycles resulting in different released versions of the software. Different versions of the software may include different features. In some instances, the features may be stand-alone features unique to a specific release and in other instances, the features may be dependent on or related to features in different releases.

SUMMARY

The present disclosure provides new and innovative systems and methods for history based build cache for program searching and testing. In an example, a system includes a memory storing a plurality of versions of a program in a program history and a processor in communication with the memory. The processor is configured to store program components of a version of the program in a first directory associated with the version and select a first candidate version of the program and a second candidate version of the program from the program history to compare to a test version of the program. The processor is also configured to compare (i) the first candidate version to the test version and (ii) the second candidate version to the test version, estimate an amount of work to regenerate the program from each of the first candidate version and the second candidate version, and select the first candidate version. The first candidate version is associated with a lesser amount of work to regenerate the program than the second candidate version. Additionally, the processor is configured to regenerate the program using components from the first candidate version to create a regenerated program, store components of the regenerated program in a second directory associated with test version, and test the regenerated program.

In an example, a method includes storing program components of a version of a program in a first directory associated with the version and selecting a first candidate version of the program and a second candidate version of the program, from a plurality of versions of the program in a program history, to compare to a test version of the program. The method also includes comparing (i) the first candidate version to the test version and (ii) the second candidate version to the test version, estimating an amount of work to regenerate the program from each of the first candidate version and the second candidate version, and selecting the first candidate version. The first candidate version is associated with a lesser amount of work to regenerate the program than the second candidate version. Additionally, the method includes regenerating the program using components from the first candidate version to create a regenerated program, storing components of the regenerated program in a second directory associated with test version, and testing the regenerated program.

In an example, a non-transitory machine-readable medium stores code, which when executed by a processor is configured to store program components of a version of a program in a first directory associated with the version and select a first candidate version of the program and a second candidate version of the program, from a plurality of versions of the program in a program history, to compare to a test version of the program. The non-transitory machine-readable medium is also configured to compare (i) the first candidate version to the test version and (ii) the second candidate version to the test version, estimate an amount of work to regenerate the program from each of the first candidate version and the second candidate version, and select the first candidate version, wherein the first candidate version is associated with a lesser amount of work to regenerate the program than the second candidate version. Additionally, the non-transitory machine-readable medium is configured to regenerate the program using components from the first candidate version to create a regenerated program, store components of the regenerated program in a second directory associated with test version, and test the regenerated program.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for history based build cache for program builds. Program source code may be compiled into a binary executable (referred to herein generally as a binary). Traditional approaches to generating a program or regenerating a program from source code (e.g., building a program) include comparing modification times of each program component of a binary with the sources from which the program is generated. For example, the binary may include various program components or source packages in a zip file. A binary that is older than the source from which the program is generated may be regenerated to ensure that the binary is regenerated from the more recent source (e.g., with dependencies from the newer source). Then the program is generated from the components.

History search is an efficient way of locating program defects because saved versions of the program are restored iteratively and each attempted version is tested for the defect. Program defects undetected during testing may lead to crashes, which may result in the programs or applications, such as microservices on the cloud, becoming unstable resulting in downtime while application code and/or application configuration files (e.g., dependencies, artifacts, libraries) are fixed and updated. For example, a new program or application or an application update may not be compatible with the runtime environment provided by a trusted execution environment ("TEE"), resulting in an application crash, TEE crash, etc. These crashes can be costly as they may cause errors for customers or end-users of the program.

The last version without the defect is then compared to the first version with the defect, and the difference between the last version and the first version indicates the source of the defect. A bisection technique can help speed up the search. For example, if a version tested did not have the defect (e.g., test passed), a newer version is tried. If the newer version does not have the defect (e.g., second test failed), an older version is tried. However, even when using the bisection technique, the program is regenerated from source multiple times as the testing process moves back and forth in program history. History search, even while utilizing the bisection technique, often results in delayed program testing while continually regenerating the program from source, which is both time consuming and computationally expensive.

Additionally, it should be appreciated that multiple files are typically changed in each history revision, which augments the delay and computational resources expended while regenerating the program from source multiple times. Furthermore, with processes that do not process program history in order, such as when using the bisection technique, it is common to regenerate or rebuild the same file multiple times. For example, each time the search moves to a newer version of the program and then back to an older one, the search process regenerates the binary. Regenerating the binary in each of these instances slows down the defect finding process, which is additionally burdensome for large programs where the search time involved is significant.

One technique to solve the problem is a build cache technique where intermediate results are stored per source file, then file contents are used to look up the build result. For example, individual components are read and used to generate a result. However, relying on file content alone is usually insufficient to determine where a defect is or whether a defect exists. In some instances, a defect may not be present unless looking at the entire version of a program. Since a file build may change based on another file, a special preprocessing stage typically takes place for the build cache technique in order to include any dependencies with the file contents. This preprocessing step takes time and is not supported for all languages (e.g., may be supported for C but not for Rust). Instead, as described in the systems and methods disclosed herein, the version of the whole project version is used as an index eliminating the need for preprocessing, which provides more speed and additional support for programing languages without a preprocessor. Furthermore, unlike the systems and methods disclosed herein, the build cache technique is unable to identify which files are old and which files are new, and therefore is unable to prune the cache intelligently (e.g., based on released versions).

To solve the problem while allowing intelligent cache pruning, each time after regenerating or rebuilding a program version, the components of the binary are stored in a directory associated with the program version. When generating or building a version of the program to test, nearest versions of the program in the program history for which build results have been saved are considered as candidate versions. Each of the candidate versions is compared to the version to test. Based on the differences or the changes between a candidate version and the version to test, an amount of work to generate or rebuild the program is estimated. The candidate version with the lowest estimate (e.g., least amount of work to rebuild the program) is then selected as a base version and components from that candidate version are used to regenerate the program. The program is then regenerated and the resulting program components are saved in the storage directory associated with the version to test. Now, the resulting program can be tested.

The process described above can be repeated when generating or building any other version of the program to test. Additionally, storage may be shared between multiple build or test computers. As multiple identical components are likely to appear and be shared between versions, various techniques, such as compression or file link may be used to reduce storage requirements. The historical builds may be maintained indefinitely such that each build may serve as candidate versions for future searches. In an example, the historical builds may also be intelligently removed or pruned. For example, a program version that is older than a predetermined life (e.g., older than 1 year) may be removed such that the storage is used to keep versions that correspond to the newest stable versions of software, such as releases. The history based build cache for both searching and testing programs reduces downtime and delays associated with generating a testing a program version thereby improving the speed, efficiency and reliability of testing a new version of a program for a new release. The present disclosure is especially advantageous to software developers and cloud providers that implement software updates over the cloud. For example, cloud providers may want to improve build speed and build efficiency when locating defects to speed up software update deliveries to customers.

Figure 1:
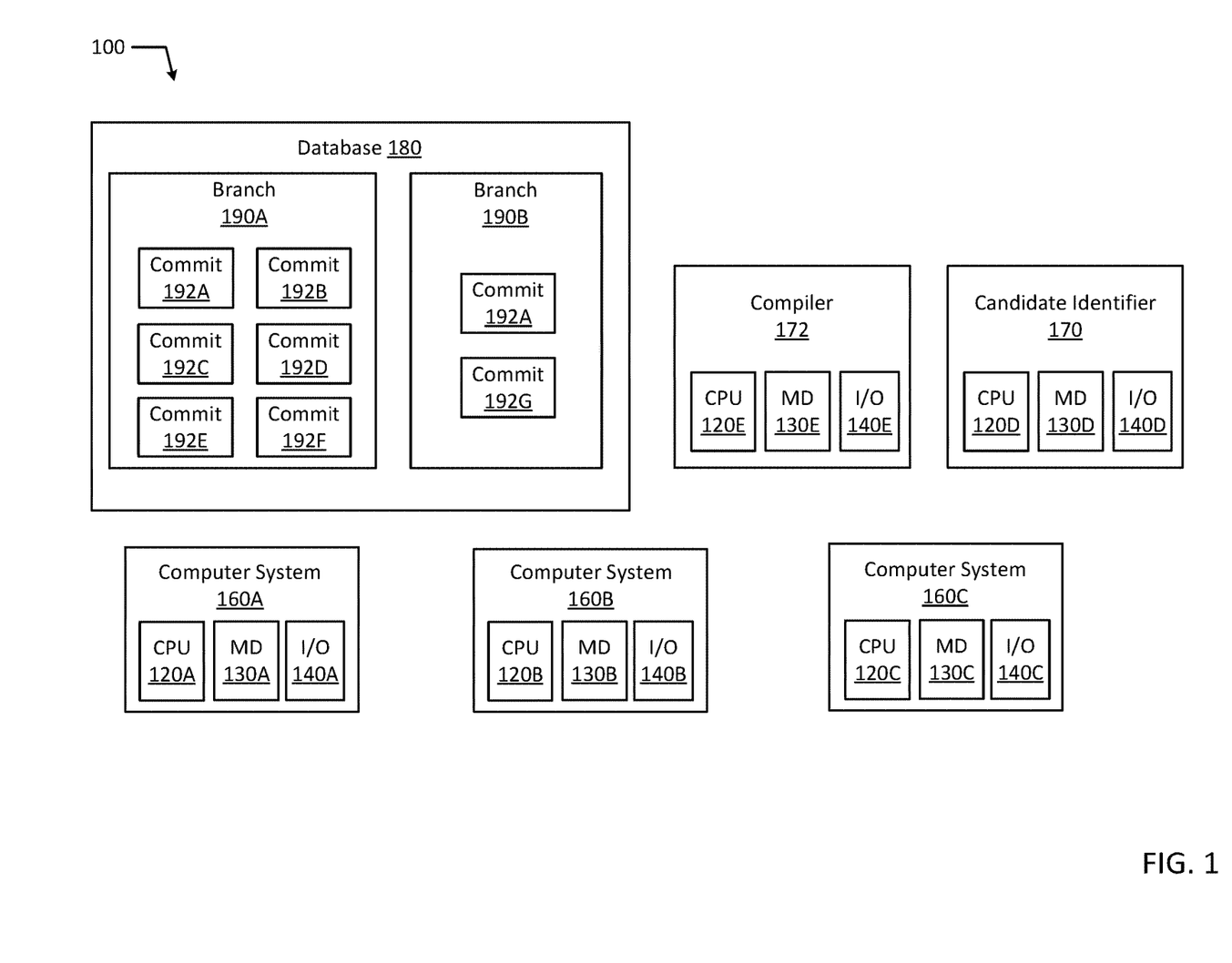
FIG. 1 illustrates a block diagram of an example computer system according to an example embodiment of the present disclosure.

FIG. 1 depicts a high-level component diagram of an example computing system 100 in accordance with one or more aspects of the present disclosure. The computing system 100 may include a database 180, a candidate identifier 170, a compiler 172, and nodes or computer systems 160A-C. The candidate identifier 170 and compiler 172 may include respective processors (e.g., CPUs 120D-E), memory devices 130D-E and input/output devices 140D-E. In another example, the candidate identifier 170 and compiler 172 may be part of one or more of the computer systems 160A-C or the corresponding processors of those systems (e.g., CPU 120A-C).

The database 180 may include program source code for various different versions of a program saved in a program history. The program history may include branches 190A-B. Each branch 190A-B, hereinafter referred to generally as branch 190, may include one or more commits 192A-G or versions of the program. The database 180 may include directories and may be network storage shared by multiple developers. Additionally, the build process may occur in a cloud environment with results stored to network storage directly. In an example, a Git commit hash may be calculated and used as an index. Git is a distributed version control system, which implements revisions as commit objects. When a developer commits changes into a repository a new commit object is created in the Git repository.

In an example, one or more of the processors 120A-E, compiler 172 or a linker, a bytecode generator, a compressor, a serializer or the like may generate or build versions of a program. When generating or building a new version of the program, components of the program's binary are stored in a directory (e.g., a directory in database 180) associated with the program version. Additionally, when generating or building a version of the program to test, a processor 120, compiler 172 or the like may consider nearest versions of the program in the program history for which build results have been saved as candidate versions. Each of the candidate versions are compared to the version to test and the test version is rebuilt from the candidate version associated with the least amount of work. For example, the test version may be built from the candidate version with the most commonality to the test version to reduce the amount or size of component files to be regenerated, which reduces the time associated with history search and also reduces the amount of time spent regenerating or rebuilding the test program. Then the test program may be tested.

The computer system 100 may include one or more nodes or computer systems 160A-C. Each node or computer system 160A-C may in turn include one or more physical processors (e.g., CPU 120A-C) communicatively coupled to memory devices (e.g., MD 130A-C) and input/output devices (e.g., I/O 140A-C). Each node or computer system 160A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. As discussed herein, I/O device 140A-E refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-E may be provided by one or more local buses of suitable architecture, for example, peripheral component interconnect (PCI).

Figure 2:
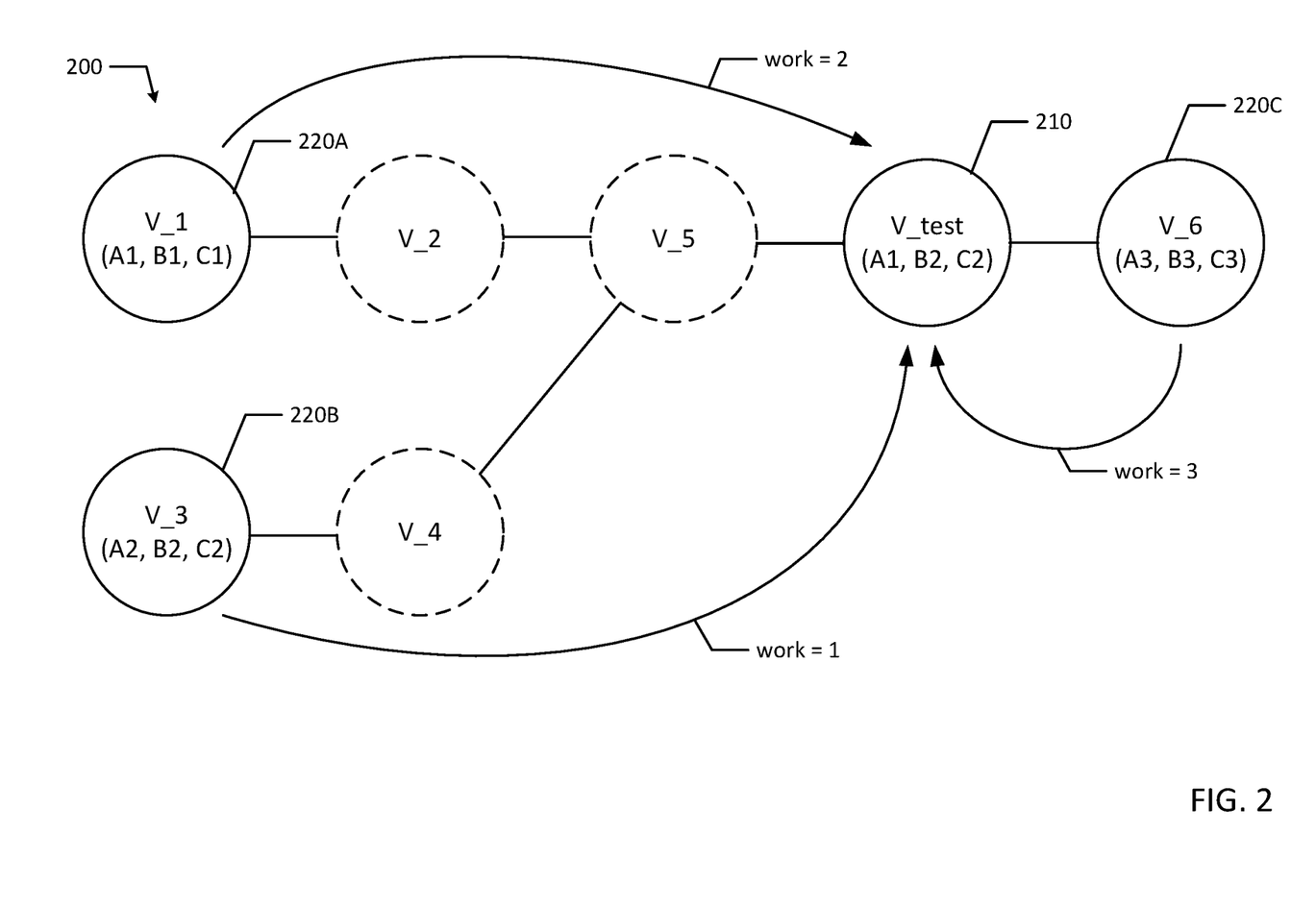
FIG. 2 illustrates a block diagram of an example program history according to an example embodiment of the present disclosure.

FIG. 2 illustrates a schematic of a program history. Components "A1", "A2", "A3", "B1", "B2", "B3", "C1", "C2" and "C3" may be source files, compiled object files, a pre-processed file, an image file, a resource file or the like. For example, components "A1", "B2" and "C2" associated with the test version 210 (e.g., "V_test") may be original source files. In another example, components "A1", "B2" and "C2" associated with the test version 210 (e.g., "V_test") may be compiled object files. The components may be part of the program version or may be generated from part of the program version.

Figure 3:
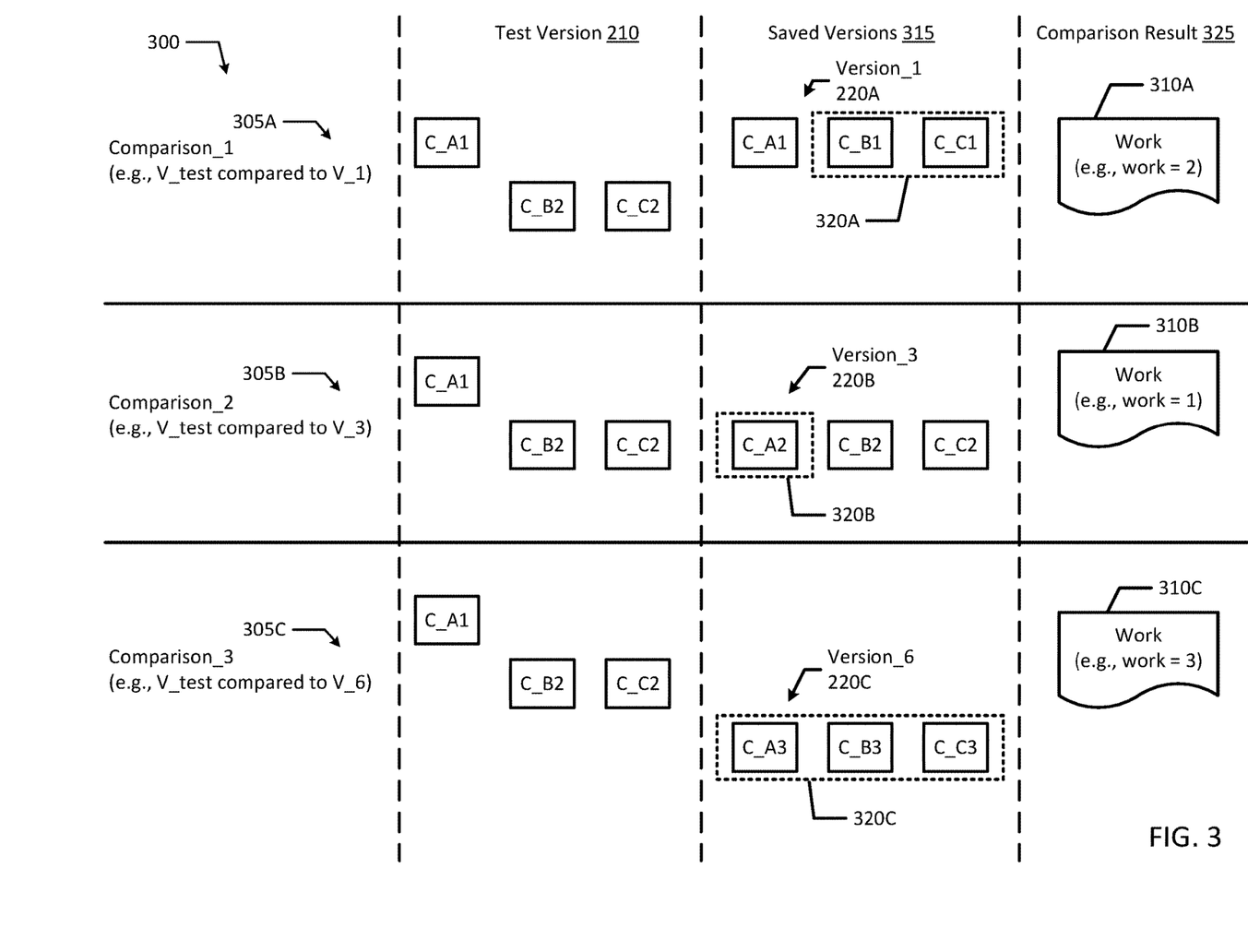
FIG. 3 illustrates a block diagram of a comparison between a test version and candidate versions of a program according to an example embodiment of the present disclosure.

FIG. 3 illustrates a comparison table 300 between a test version and candidate versions of a program. The comparison table illustrates each comparison 305A-C between a test version 210 and saved versions 315 of a program (e.g., candidate versions) as well as the comparison result 325. As illustrated in FIGS. 2 and 3, the test version 210 (e.g., "V_test") may be compared to a first candidate version 220A (e.g., "V_1"), a second candidate version 220B (e.g., "V_3") and a third candidate version 220C (e.g., "V_6") to determine an estimated amount of work (e.g., work 310A-C) to regenerate the test version 210 from each of the respective candidate versions 220A-C. The estimated amount of work (e.g., work 310A-C) may be indicative of the amount of work to regenerate the program from the components of the test version 210 as well as components from the respective candidate version (e.g., candidate version 220A-C). The test version 210 is made up of components "A1", "B2" and "C2" denoted by ("C_A1", "C_B2" and "C_C2"). The first candidate version 220A (e.g., "V_1") is made up of components "A1", "B1" and "C1" denoted by ("C_A1", "C_B1" and "C_C1"). The difference between the test version 210 and the first candidate version 220A is between the "B" and "C" components. Both the test version 210 and the first candidate version 220A use the same version of the "A" component (e.g., "C_A1"), but they use different versions of both the "B" and "C" components. For example, the test version 210A uses second versions of the "B" and "C" components while the first candidate version 220A uses first versions of the "B" and "C" components (e.g., "C_B2" and "C_C2" vs. "C_B1" and "C_C1"). The amount of work 310A estimated for the comparison between the test version 210 and the first candidate version 220A is "work=2" because there is a difference 320A of two component between the test version 210 and the first candidate version 220A.

Similarly, a comparison 305B between the test version 210 (e.g., "V_test") and the second candidate version 220B may be conducted. The second candidate version 220B (e.g., "V_3") is made up of components "A2", "B2" and "C2" denoted by ("C_A2", "C_B2" and "C_C2"). The difference between the test version 210 and the second candidate version 220B is between the "A" components. Both the test version 210 and the second candidate version 220B use the same version of the "B" and "C" components (e.g., "C_B2" and "C_C2"), but they use different versions the "A" component. For example, the test version 210 uses a first version of the "A" component while the second candidate version 220B uses a second version of the "A" component (e.g., "C_A1" vs. "C_A2"). The amount of work 310B estimated for the comparison between the test version and the second candidate version is "work=1" because there is a difference 320B of one component between the test version 210 and the second candidate version 220B.

A comparison 305C between the test version 210 (e.g., "V_test") and the third candidate version 220C may also be conducted. The third candidate version 220C (e.g., "V_6") is made up of components "A3", "B3" and "C3" denoted by ("C_A3", "C_B3" and "C_C3"). The difference between the test version 210 and the third candidate version 220C is between each of the "A", "B" and "C" components. The test version 210 and the third candidate version 220C use different versions the "A", "B" and "C" components. For example, the test version 210 uses a first version of the "A" component while the third candidate version 220C uses a third version of the "A" component (e.g., "C_A1" vs. "C_A3"). Additionally, the test version 210 uses second versions of the "B" and "C" components while the third candidate version 220C uses third versions of the "B" and "C" components (e.g., "C_B2" and "C_C2" vs. "C_B3" and "C_C3"). The amount of work estimated for the comparison between the test version 210 and the third candidate version 220C is "work=3" because there is a difference 320C of three components between the test version 210 and the second candidate version 220C.

The comparisons may include generating a list of source files and/or a list of component files for the test version 210 and each of the candidate versions 220A-C. Then, the lists may be compared to generate lists of source files and/or component files that are the same between the test version 210 and each respective candidate versions 220A-C. Additionally, lists of source files and/or component files that are different between the test version 210 and each respective candidate version 220A-C may also be generated. Time stamps for files that are the same may stay unchanged or may be set to their original timestamp (e.g., original creation time). Time stamps for files that are different may be set to a current time. Comparisons 305A-C may be run in series or in parallel. For example, multiple comparisons 305A-C may be executed at the same time. Additionally, comparisons may be executed separately, for example, after a previous comparison is finished.

The estimated amount of work 310 may be based on the quantity of source files that differ between the test version 210 and the candidate version 220. In another example, a list of component files to be regenerated may be created from the list of source files that differ between the test version 210 and the candidate version 220. The estimated amount of work 310 may be based on the quantity of component files to be regenerated. Additionally, the combined size of the component files may be used to determine the estimated amount of work 310. Furthermore, a combination of one or more of the quantity of source files, quantity of component files, and size of component files may be used to estimate the amount of work to regenerate the program. In some examples, different weighting factors may be applied to one or more of the quantity of source files, quantity of component files, and size of component files when estimating the amount of work to regenerate the program.

The candidate version 220B (e.g., "V_3") associated with the least amount of work (e.g., "work=1") may be selected as the base version and the components of that base version may then be used to regenerate the program. For example, components from unchanged parts of the candidate version 220B along with components from changed parts of the test version 210 may be used to regenerate the program. In an example, the components may be loaded directly to a build computer or node, which may include a linker, a bytecode generator, a compressor, a compiler or the like to generate the program. Files that are identical between the base version and the test version may retain their original time stamps (e.g., modification time remains the same as it was with the component files in the candidate version) while files that are different may include the current time on their time stamps (e.g., modification time is set to current time).

The resulting components of the regenerated program are then saved in a storage directory associated with the test version so they can be used in future comparisons. Then, the resulting program can be tested by the developers.

Figure 4:
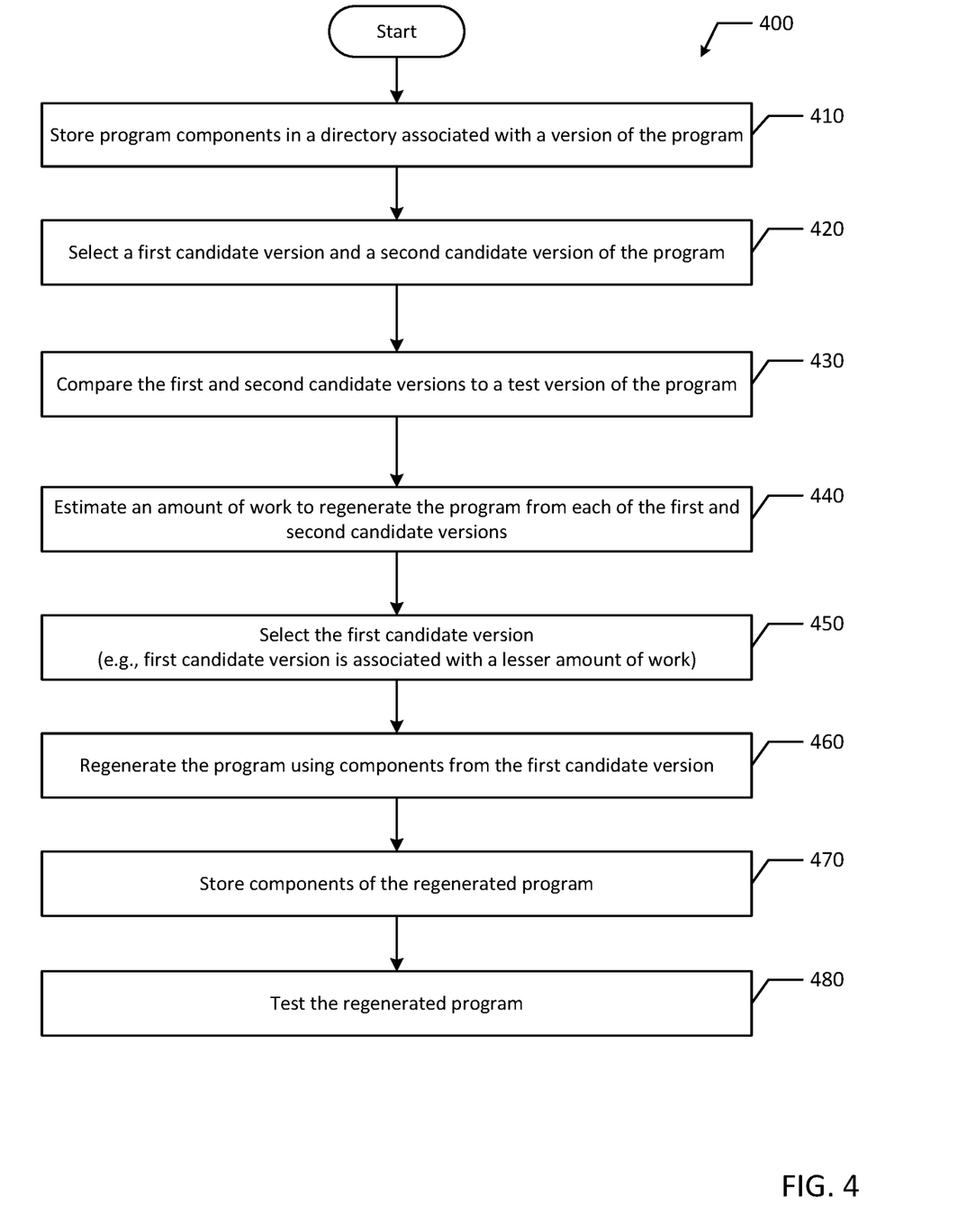
FIG. 4 illustrates a flowchart of an example process for history based build cache for program builds according to an example embodiment of the present disclosure.

FIG. 4 illustrates flowchart of an example method 400 for history based build cache for program builds in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example 400 includes storing program components in a directory associated with a version of the program (block 410). For example, a processor 120 may store program components of a version of a program in a first directory associated with the version. Method 400 also includes selecting a first candidate version and a second candidate version of the program (block 420). For example, the processor 120 may select a first candidate version 220A of the program and a second candidate version 220B of the program, from a plurality of versions of the program in a program history 200, to compare to a test version 210 of the program. Referring back to FIG. 2, the program history 200 may include a plurality of versions (e.g., versions "V_1" to "V_6") of the program for which build results have been saved. In the example illustrated in FIG. 2, build results were not saved for versions "V_2" "V_4" and "V_5" and thus those versions are unavailable as candidate versions 220A-C.

Method 400 contemplates selecting a first candidate version 220A and a second candidate version 220B, however as illustrated in FIGS. 2 and 3, three candidate versions 220A-C are selected for comparison. In other examples, more than three candidate versions 220 may be selected for comparison. For example, the amount of candidate versions 220 selected for comparison may be based on their proximity (e.g., whether they are the closest) to the test version 210 in the program history 200, the amount of program versions saved in the program history 200, etc.

Additionally, the method 400 includes comparing the first and second candidate versions to a test version of the program (block 430). For example, the processor 120 may compare (i) the first candidate 220A version to the test version 210 and may also compare (ii) the second candidate version 220B to the test version 210. The test version 210 may be pre-built and selected from the program history 200. In another example, the test version 210 may be built prior to selecting the first and second candidate versions 220A-B of the program. When comparing candidate versions 220A-B to the test version 210, the source files of each version may be compared. Similarly, a list of component files for each version may be compared.

Method 400 also includes estimating an amount of work to regenerate the program from each of the first and second candidate versions (block 440). For example, the processor 120 may estimate an amount of work 310A-B to regenerate the program from each of the first candidate version 220A and the second candidate version 220C. Estimating the amount of work 310 to regenerate the program from the first candidate version 220A and the second candidate version 220C includes estimating an amount of work to regenerate the program from the components of the test version 210 and the components of each of the first candidate version 220A and the second candidate version 220C.

Referring back to FIG. 2, the amount of work 310A to regenerate the program from the first candidate version 220A (e.g., V_1) is estimated as "work=2" and the amount of work 310B to regenerate the program from the second candidate version 220C (e.g., V_6) is estimated as "work=3". The values of "work=2" and "work=3" indicate the quantity of component files that are different between the test version 210 and each candidate version 220. As mentioned above, the estimated amount of work 310A associated with the first candidate version 220A may be the work to regenerate the program from components of the test version 210 and the components of the first candidate version 220A. Similarly, the estimated amount of work 310B associated with the second candidate version 220C may be the work to regenerate the program from the components of the test version 210 and the components of the second candidate version 220C. It should be appreciated that other values or quantities for the estimates may be used. For example, the estimated amount of work 310 may instead be a measure of file size (e.g., MB) for the cumulative size of the files that are different between each version.

To estimate the amount of work to regenerate or rebuild the program from the first candidate version 220A, a list of source files that differ between the test version 210 of the program and the first candidate version 220A may be considered. For example, the estimated amount of work 310 may be based on the quantity of source files that differ between the test version 210 and the candidate version 220. In another example, a list of component files to be regenerated may be created from the list of source files that differ between the test version 210 and the candidate version 220. The estimated amount of work 310 may be based on the quantity of component files to be regenerated. Additionally, the combined size of the component files may be used to determine the estimated amount of work 310. For example, the estimated amount of work 310 may be an estimate that is indicative of the amount of work to regenerate the program from the components of the test version 210 and the components of a respective candidate version 220. Furthermore, a combination of one or more of the quantity of source files, quantity of component files, and size of component files may be used to estimate the amount of work to regenerate the program. In some examples, different weighting factors may be applied to one or more of the quantity of source files, quantity of component files, and size of component files when estimating the amount of work to regenerate the program.

Then, the method 400 includes selecting the first candidate version (block 450). For example, the processor 120 may select the first candidate version 220A, which is associated with a lesser amount of work to regenerate the program than the second candidate version 220C. In the illustrated example, the first candidate version 220A is associated with a lesser amount of work than the second candidate version 220C, however in other scenarios, the second candidate version 220B may be associated with a lesser amount of work. For example, referring back to FIG. 2, if the second candidate version was selected to be "V_3", then the second candidate version 220B would be associated with less work (e.g., "work=1") than the first candidate version 220A which is associated with more work (e.g., "work=2").

Method 400 also includes regenerating the program using components from the first candidate version (block 460). For example, the processor 120 may regenerate the program using components from the first candidate version 220A to regenerate the program. For example, components created from unchanged parts of the first candidate version 220A along with components from the test version 210 (e.g., components created from changed parts) may be used to regenerate the program. In an example, one or more of a linker, a bytecode generator, a compressor, a compiler or the like may execute on the processor 120 to regenerate the program. Additionally, the method includes storing components of the regenerated program (block 470). For example, the processor 120 may store components of the regenerated program in a second directory associated with the test version 210.

Method 400 also includes testing the regenerated program (block 480). For example, the processor 120 may test the regenerated program. By regenerating or rebuilding the program from the candidate version 220A associated with the least amount of work 310A, program testing may be conducting in an efficient manner without waiting for many different binaries to regenerate, which would otherwise slow down to search process. The delay and resource consumption may be significant and additionally burdensome for large programs.

Figure 5A:
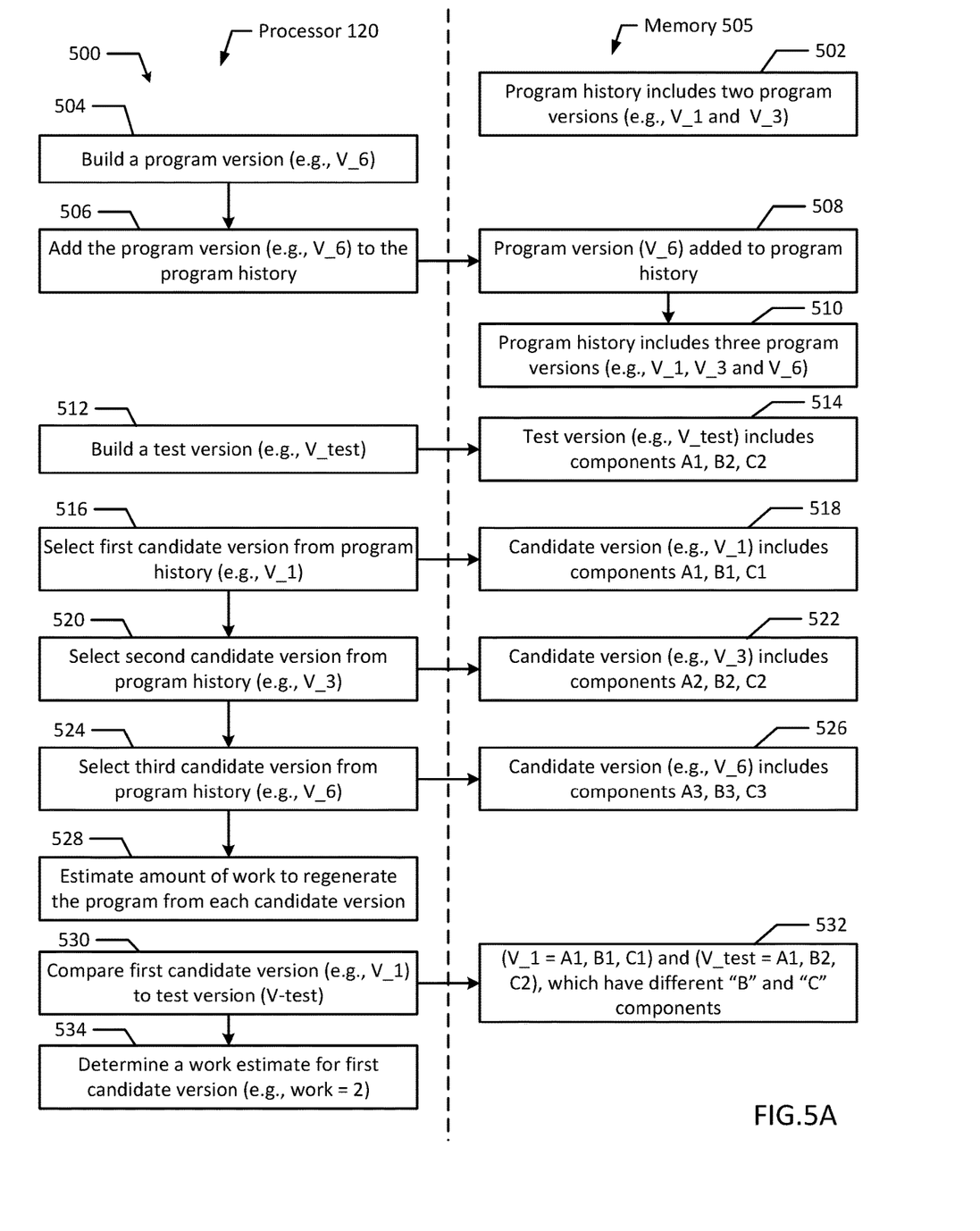
FIGS. 5A and 5B illustrate a flow diagram of an example process for history based build cache for program builds according to an example embodiment of the present disclosure.
Figure 5B:
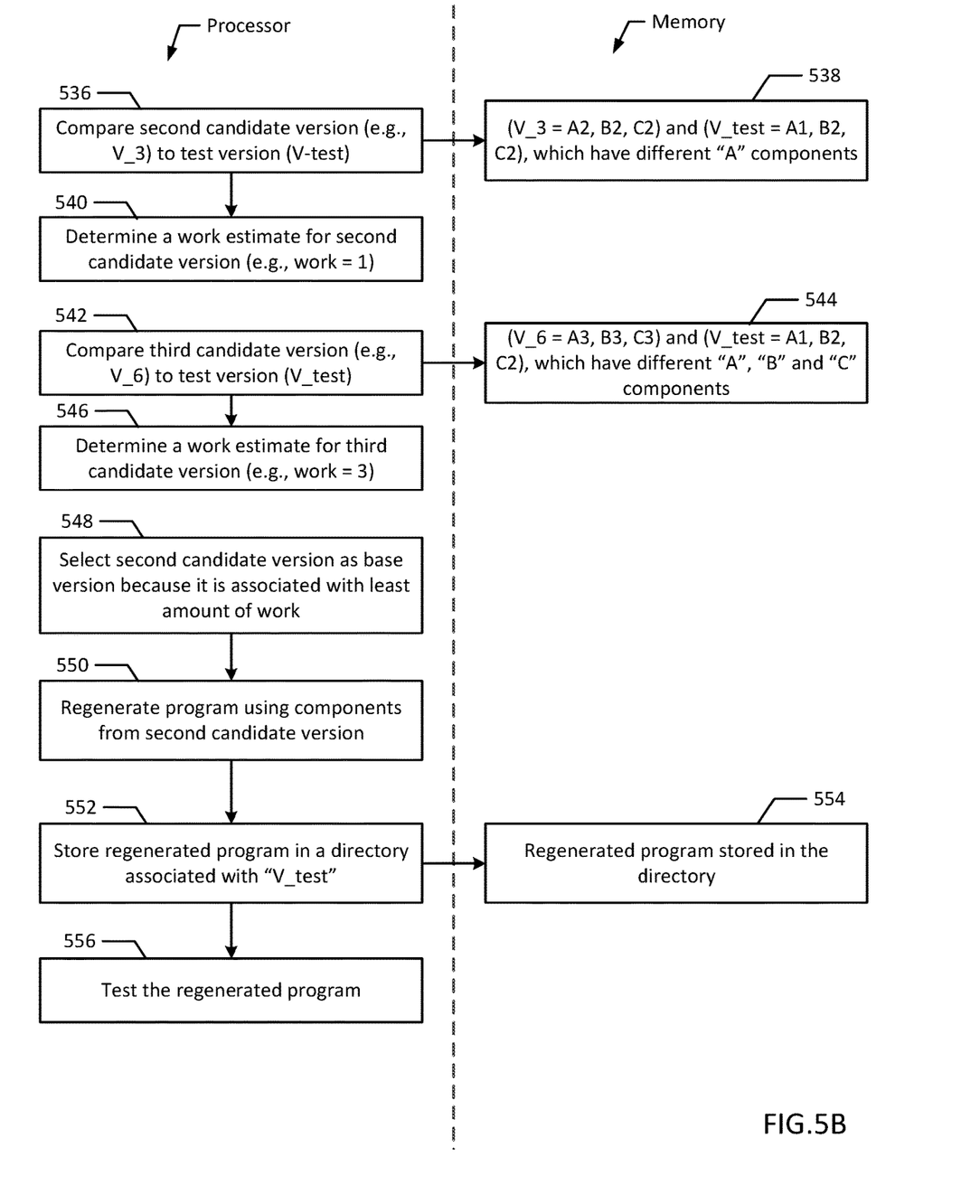

FIGS. 5A and 5B illustrate a flowchart of an example method 500 for testing applications running in containers using volume mount. Although the example method 500 is described with reference to the flowcharts illustrated in FIGS. 5A and 5B, it will be appreciated that many other methods of performing the acts associated with the method 500 may be used. For example, the order of some of the blocks may be changed, certain blocks may be combined with other blocks, blocks may be repeated, and some of the blocks described are optional. The method 500 may be performed by a processor 120 (or a linker, a bytecode generator, a compressor, a serializer or the like) and memory 505.

In the illustrated example, a program history 200 includes two program versions (e.g., "V_1" and "V_3") (block 502. The program history may include other program versions that are not yet saved in the program history 200. The processor 120 generates or builds a new program version (e.g., "V_6") (block 504). The new program version (e.g. "V_6") may include additional files or different versions of component files than the other programs in the program history 200. The processor 120 adds the program version (e.g., "V_6") to the program history 200 (block 506). Then, the program version (e.g., "V_6") is added to the program history in memory 505. The program history 200 may be saved in a database or a register. Additionally, each program version may be a different commit 192A-G along a branch 190A-B of the program history 200. Now, the program history 200 includes three program version (e.g., "V_1", "V_3" and "V_6") (block 510).

The processor 120 generates or builds a test version of the program (e.g., "V_test") (block 512). The test version (e.g. "V_test") may include additional files or different versions of component files that a developer plans to test before implementing the new program version. In the illustrated example, the test version 210 (e.g., "V_test" includes components "A1", "B2" and "C2" (block 514). For example, the test version 210 may include three different component files of different versions or timestamps. For example, a component file that is a second version (e.g., "B2") may be a more recent version with a later timestamp than a component file that is a first version (e.g., "B1").

The processor 120 selects a first candidate version 220A (e.g., "V_1") from the program history 200 (block 516). The first candidate version 220A may be selected based on its proximity (e.g., closest) to the test version 210 in the program history 200. In the illustrated example, the first candidate version 220A (e.g., "V_1") includes components "A1", "B1" and "C1" (block 518). For example, "V_1" includes first versions of components "A", "B" and "C". Then, the processor 120 selects a second candidate version 220B (e.g., "V_3") from the program history 200 (block 520). Similar to candidate version 220A, the second candidate version 220B may be selected based on its proximity to the test version 210 in the program history. In the illustrated example, the second candidate version 220B (e.g., "V_3") includes components "A2", "B2" and "C2" (block 522). For example, "V_3" includes second versions of components "A", "B" and "C". The second versions of components "A", "B" and "C" may be more recent versions with more recent timestamps than the version components in the first candidate version 220A.

Similarly, the processor 120 selects a third candidate version 220C (e.g., "V_6") of the program history 200 (block 524). Candidate versions 220A-C may be selected based on their respective proximity to the test version 20, based on the amount of program versions saved in the program history 200, or based on other factors. In the illustrated example, the third candidate version 220C (e.g., "V_6") includes components "A3", "B3" and "C3" (block 526). For example, "V_6" includes third versions of components "A", "B" and "C". The third versions of components "A", "B" and "C" may be more recent versions with more recent timestamps than the version components in the second candidate version 220B, which may be more recent versions with more recent timestamps than the first version of components in the first candidate version 220A.

After selecting the candidate versions, the processor estimates the amount of work to regenerate the program from each candidate version 220A-C (block 528). To estimate the amount of work, the processor 120 may compare each of the candidate versions 220A-C to the test version 210. For example, in the illustrated example, the processor compares the first candidate version 220A (e.g., "V_1") to the test version 210 (e.g., "V_test") (block 530). In the illustrated example, the comparison involves comparing a list of component files of the test version 210 to a list of component files for the first candidate version 220A. The comparison reveals that the first candidate version 220A and the test version 210 have different "B" and "C" components (block 532). For example, the timestamps of the "B" and "C" components may be different. Based on the comparison, the processor 120 determines a work estimate for the first candidate version 220A (e.g., "work=2") (block 534). For example, the work estimate may be an estimate of an amount of work to regenerate the program from the components of the test version 210 and the components of the first candidate version 220A.

The processor 120 compares the second candidate version 220B (e.g., "V_3") to the test version 210 (e.g., "V_test") (block 536). The comparison involves comparing a list of component files of the test version 210 to a list of component files for the second candidate version 220A, however other comparison techniques may be used. The comparison reveals that the second candidate version 220B and the test version 210 have different "A" components (block 538). For example, the timestamps of the "A" components may be different. Based on the comparison, the processor 120 determines a work estimate for the second candidate version 220B (e.g., "work=1") (block 540).

Similarly, the processor 120 compares the third candidate version 220C (e.g., "V_6") to the test version 210 (e.g., "V_test") (block 542). The comparison reveals that the third candidate version 220C and the test version 210 have different "A", "B" and "C" components (block 544). For example, the timestamps of the "A", "B" and "C" components may be different. Based on the comparison, the processor 120 determines a work estimate for the third candidate version 220C (e.g., "work=3") (block 546).

Because the second candidate version 220B is associated with the lowest amount of work (e.g., "work=1"), the processor 120 selects the second candidate version 220B as a base version (block 548). For example, by selecting candidate version 220B as the base version, less work is required to regenerate the test version of the program from the base version.

The processor 120 regenerates the program using components from the second candidate version, which is used as the base version (block 550). Components from the second candidate version 220B and components from the test version 210 may be to regenerate the program. For example, components created from unchanged parts (e.g., parts with the same timestamp) may be used from the second candidate version 220B while components created from changed parts (e.g., parts with different timestamps) may be used from the test version 210. In the illustrated example, only the "A" components are different and therefore only a single component of the binary is regenerated (e.g., the "A2" component) before generating the program from the components. Since the other components (e.g., "B2" and "C2") are the same as in the candidate version now used as the base version, those components do not need to be regenerated.

Additionally, the processor 120 stores the regenerated program in a directory associated with "V_test" (block 552). Each of the directories may be located in network storage and shared between developers. Now the regenerated program is stored in the directory in memory 505 (block 554). After regenerating the program, the regenerated program may be tested (block 556).

Figure 6:
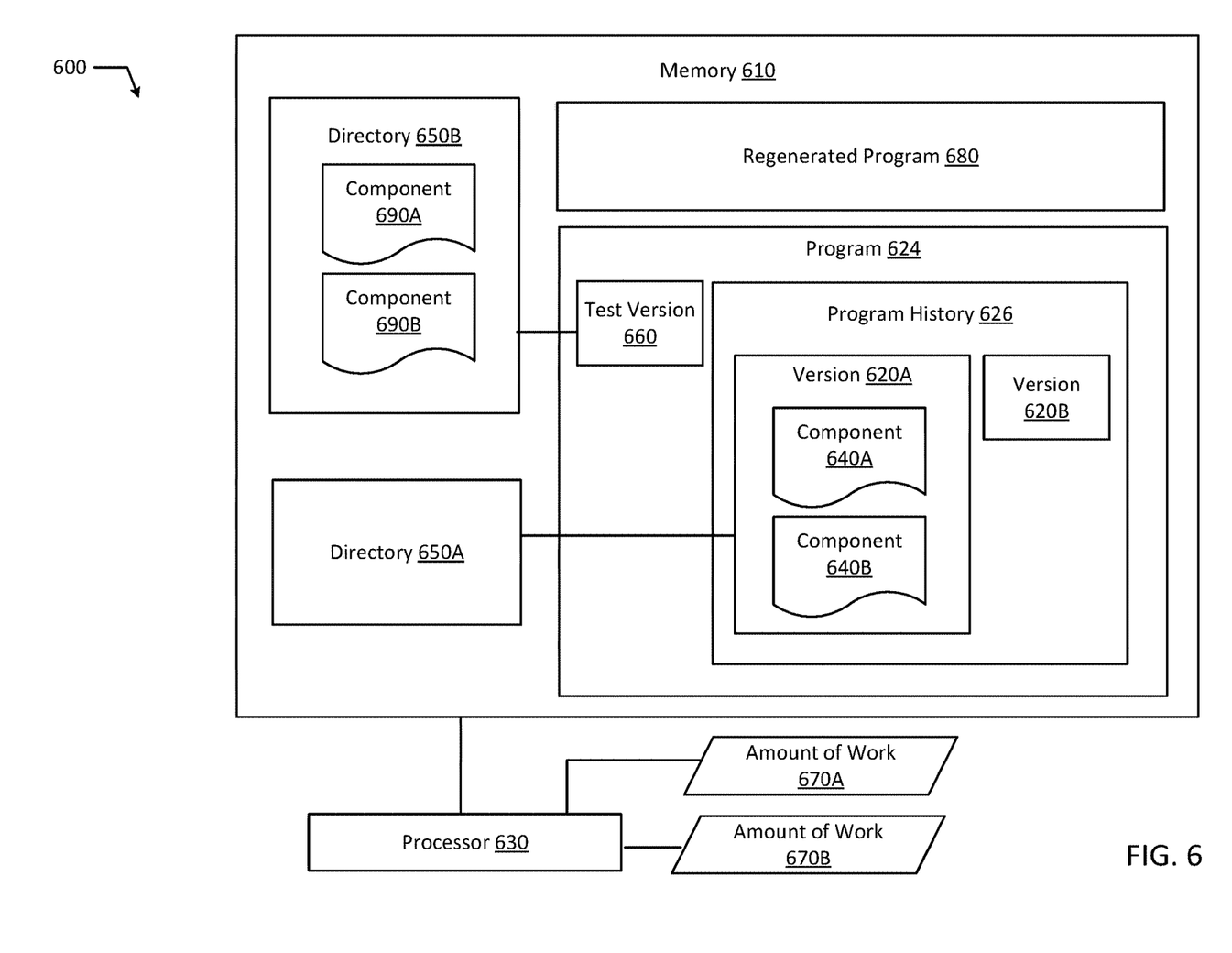
FIG. 6 illustrates a block diagram of an example build cache system according to an example embodiment of the present disclosure.

FIG. 6 is a block diagram of an example build cache searching a testing system 600 according to an example of the present disclosure. The build cache searching a testing system 600 may include a memory 610 storing a plurality of versions 620A-B of a program 624 in a program history 626 and a processor 630 in communication with the memory 610. The processor 630 is configured to store program components 640A-B of a version (e.g., version 620A) of the program 624 in a first directory 650A associated with the version (e.g., version 620A) and select a first candidate version (e.g., version 620A) of the program 624 and a second candidate version (e.g., version 620B) of the program 624 from the program history 626 to compare to a test version 660 of the program. The processor 630 is also configured to compare (i) the first candidate version (e.g., version 620A) to the test version 660 and (ii) the second candidate version (e.g., version 620B) to the test version 660, estimate an amount of work 670A-B to regenerate the program 624 from each of the first candidate version (e.g., version 620A) and the second candidate version (e.g., version 620B), and select the first candidate version (e.g., version 620A). The first candidate version (e.g., version 620A) is associated with a lesser amount of work 670A to regenerate the program 624 than the second candidate version (e.g., version 620B). Additionally, the processor 630 is configured to regenerate the program 624 using components 640A-B from the first candidate version (e.g., version 620A) to create a regenerated program 680, store components 690A-B of the regenerated program 680 in a second directory 650B associated with test version 660, and test the regenerated program 680.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory storing a plurality of versions of a program in a program history; and
a processor in communication with the memory configured to:
store program components of a version of the program in a first directory associated with the version,
select a first candidate version of the program and a second candidate version of the program from the program history to compare to a test version of the program to be regenerated,
compare (i) the first candidate version to the test version and (ii) the second candidate version to the test version,
estimate an amount of work to regenerate the program from each of the first candidate version and the second candidate version,
select the first candidate version, wherein the first candidate version is associated with a lesser amount of work to regenerate the program than the second candidate version,
regenerate the program using components from the first candidate version to create a regenerated program as the test version,
store components of the regenerated program in a second directory associated with the test version, and
test the regenerated program as the test version.

2. The system of claim 1, wherein the memory is network storage that includes the first directory and the second directory.

3. The system of claim 1, wherein an index of each version of the plurality of versions of the program is based on an entire respective version of the program, and wherein a git commit hash of the version of the program is calculated for the index.

4. The system of claim 1, wherein the first candidate version and the second candidate version are the two respective versions that are positioned closest to the test version in the program history.

5. The system of claim 1, wherein when comparing (i) the first candidate version to the test version, the processor is further configured to:
compare a first list of source files associated with the first candidate version to a second list of source files associated with the test version, and
generate a third list of source files that includes respective source files that differ between the first list and the second list.

6. The system of claim 5, wherein estimating the amount of work to regenerate the program includes one of (i) determining a quantity of source files that differ between the first list and the second list, (ii) determining a cumulative size of each file in the third list, and (iii) determining a work estimate based on (i) and (ii).

7. The system of claim 1, wherein when regenerating the program, the processor is configured to:
generate a first list of source files that differ between the first candidate version and the test version,
generate a second list of source files that are the same between the first candidate version and the test version,
set a first time stamp for each respective file on the first list of source files to a current time, and
set a second time stamp for each respective file on the second list of source files to an original time.

8. A method comprising:
storing program components of a version of a program in a first directory associated with the version;
selecting a first candidate version of the program and a second candidate version of the program, from a plurality of versions of the program in a program history, to compare to a test version of the program;
comparing (i) the first candidate version to the test version and (ii) the second candidate version to the test version;
estimating an amount of work to regenerate the program from each of the first candidate version and the second candidate version;
selecting the first candidate version, wherein the first candidate version is associated with a lesser amount of work to regenerate the program than the second candidate version;
regenerating the program using components from the first candidate version to create a regenerated program as the test version;
storing components of the regenerated program in a second directory associated with the test version; and
testing the regenerated program as the test version.

9. The method of claim 8, wherein program components are components of a binary and are stored in network storage.

10. The method of claim 8, wherein the version of the program is built in a cloud environment.

11. The method of claim 8, wherein an index of each version of the plurality of versions of the program is based on an entire respective version of the program, and wherein a git commit hash of the version of the program is calculated for the index.

12. The method of claim 8, wherein the plurality of versions of the program are organized in the program history, and the first candidate program version and the second candidate program version are the two respective versions that are positioned closest to the test version in the program history.

13. The method of claim 8, wherein comparing the first candidate version to the test version includes comparing a first list of source files associated with the first candidate version to a second list of source files associated with the test version and generating a third list of source files that includes respective source files that differ between the first list and the second list.

14. The method of claim 13, wherein estimating the amount of work to regenerate the program includes one of (i) determining a quantity of source files that differ between the first list and the second list, (ii) determining a cumulative size of each file in the third list, and (iii) determining a work estimate based on (i) and (ii).

15. The method of claim 8, further comprising building the test program.

16. The method of claim 8, wherein regenerating the program includes:
   generating a first list of source files that differ between the first candidate version and the test version;
   generating a second list of source files that are the same between the first candidate version and the test version;
   setting a first time stamp for each respective file on the first list of source files to a current time; and
   setting a second time stamp for each respective file on the second list of source files to an original time.

17. A non-transitory machine-readable medium storing code, which when executed by a processor is configured to:
   store program components of a version of a program in a first directory associated with the version,
   select a first candidate version of the program and a second candidate version of the program, from a plurality of versions of the program in a program history, to compare to a test version of the program,
   compare (i) the first candidate version to the test version and (ii) the second candidate version to the test version,
   estimate an amount of work to regenerate the program from each of the first candidate version and the second candidate version,
   select the first candidate version, wherein the first candidate version is associated with a lesser amount of work to regenerate the program than the second candidate version,
   regenerate the program using components from the first candidate version to create a regenerated program as the test version,
   store components of the regenerated program in a second directory associated with the test version, and
   test the regenerated program as the test version.

18. The non-transitory machine-readable medium of claim 17, wherein the first directory and the second directory are located in network storage.

19. The non-transitory machine-readable medium of claim 17, wherein when comparing (i) the first candidate version to the test version, the processor is further configured to:
   compare a first list of source files associated with the first candidate version to a second list of source files associated with the test version, and
   generate a third list of source files that includes respective source files that differ between the first list and the second list.

20. The non-transitory machine-readable medium of claim 19, wherein estimating the amount of work to regenerate the program includes one of (i) determining a quantity of source files that differ between the first list and the second list, (ii) determining a cumulative size of each file in the third list, and (iii) determining a work estimate based on (i) and (ii).

* * * * *